(12) United States Patent
Danninger

(10) Patent No.: US 6,619,141 B2
(45) Date of Patent: Sep. 16, 2003

(54) METHOD OF DYNAMICALLY COMPENSATING A PROCESS SIGNAL

(76) Inventor: Dirk Soren Danninger, 597 4th St., Elko, NV (US) 89801

( * ) Notice: Subject to any disclaimer, the term of this patent is extended or adjusted under 35 U.S.C. 154(b) by 82 days.

(21) Appl. No.: 09/860,380

(22) Filed: May 18, 2001

(65) Prior Publication Data

US 2002/0174729 A1 Nov. 28, 2002

(51) Int. Cl.$^7$ .................................................. G01F 1/44
(52) U.S. Cl. ...................................... 73/861.63; 702/98
(58) Field of Search ........................ 73/861.63; 702/99, 702/98, 90, 89, 176, 187, 188

(56) References Cited

U.S. PATENT DOCUMENTS

| | | |
|---|---|---|
| 4,598,381 A | 7/1986 | Cucci |
| 5,329,818 A | 7/1994 | Frick |
| 5,394,345 A | 2/1995 | Berard et al. |
| 5,623,101 A | 4/1997 | Freitag |

*Primary Examiner*—Edward Lefkowitz
*Assistant Examiner*—Charlene Dickens
(74) *Attorney, Agent, or Firm*—Kyle W. Rost

(57) ABSTRACT

A pressure signal from a differential pressure transducer is dynamically compensated for error, such as zero point drift, due to time passage or temperature change. A processor associated with a pressure transducer employs an algorithm to continuously monitor the pressure signal to determine when signal characteristics indicate zero signal level. Then the algorithm determines a current correction factor or updates a previously determined correction factor, and records the current correction factor in a non-volatile memory as a function of ambient temperature. When the signal characteristics indicate other than a zero signal level, such as when differential pressure is non-zero, the algorithm recalls from memory and applies the most recently determined correction factor for a corresponding ambient temperature. Suitable time intervals for determining a current correction factor are found by monitoring the process signal and seeking those time periods when the signal is both calm and quiet, i.e., when signal level is both below a preset threshold and fluctuating very little. Taking a time derivative of the output signal and comparing the derivative to a predetermined maximum value can determine the latter.

15 Claims, 6 Drawing Sheets

METHOD OF DYNAMICALLY COMPENSATING A PROCESS SIGNAL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFISCH APPENDIX"

Not Applicable

BACKGROUND OF THE INVENTION

1. Field of the Invention

The invention generally relates to measuring and testing and specifically to instrument proving and calibrating. In greater detail, the invention is applied to set point adjustment, e.g., zero correction. In a further aspect, the invention is applied to measuring and testing; to instrument proving and calibrating; to volume of flow, speed of flow, volume rate of flow, or mass rate of flow; with signal processing, set point adjustment, e.g., zero correction. The invention is a method and apparatus for the dynamic calibration of a pressure transducer passing a signal whose output strength is proportional to applied pressure or to pressure differential.

2. Description of Related Art Including Information Disclosed Under 37 CFR 1.97 and 1.98

The flow rate of a fluid can be detected and monitored by measuring a parameter that varies in a corresponding way to the flow. Wind speed, for example, commonly is monitored by a cup anemometer, which rotates in a wind stream in proportion to wind velocity. The mechanical movement of the cups can be translated into a signal indicative of wind speed by known systems that employ conventional electrical, magnetic, and mechanical means. Because a cup anemometer relies upon moving parts, its accuracy and reliability are degraded over time by mechanical wear and corrosion. Adverse climates can damage a mechanical moving system quite rapidly, such as by sand abrasion in desert areas or icing in high mountainous regions. In addition, a moving mechanical system tends to have limited accuracy, especially at low fluid flow rates where mechanical friction becomes an increasingly large source of error.

In order to overcome the problems inherent in a mechanical system, various types of motionless anemometers have been developed. Some of these operate on the principal of thermal diffusion, by monitoring a heated wire in a wind stream. Such a wire has a known temperature coefficient of resistance. The rate of heat loss, which may correspond to the electrical energy needed in order to sustain a specified resistance, provides a measurable parameter corresponding to wind speed. However, thermal anemometers also face environmental deterioration due to deposits of dirt and other atmospheric pollutants. Over time, they are known to become less accurate in detecting wind speed, particularly at low wind velocity. Another variety of anemometer employs one or more pressure transducers for determining differential pressure between a static pressure and a measured pressure, which result can be correlated with wind speed. The directly measured parameter in the pressure cell is capacitance. The sensitivity of a pressure transducer also tends to decrease over time, typically due to aging, accumulations of dirt and deposit of other atmospheric contaminants. There are still other known systems for measuring wind velocity, although substantially all employ electronic components in order to obtain a sensor reading and interpretation. Loss of accuracy over time remains a persistent problem, particularly at low velocity readings. Both deposits on the sensors and aging of all circuit components contribute to loss of sensitivity and read-out error.

Transducers are calibrated at the time of manufacture so that one or more correction values that will be applied to the output of the transducer. These correction values deal with factors such as ambient temperature, which can cause zero point drift. Overall, the manufacturer attempts to fingerprint the transducer's performance over its operating range and then compensate for any discovered inaccuracy. Fingerprinting is conducted under controlled temperature conditions. A modem transducer is associated with a processor that is programmed to apply corresponding correction factors to the output signal. Although fingerprinting can add accuracy to the transducer's output performance based upon the transducer's characteristics at the time of manufacture, fingerprinting cannot correct for aging and for perhaps other factors. Thus, although it is known to correct the zero level by compensating for output levels as a function of temperature, in practice the data supporting the correction is created in a static, one-time event, such as at the time of manufacture. It would be possible to recalibrate a transducer during its life, such as by returning it to the manufacturer for adjustment. However, this is impractical because the transducer has been installed in an operating device deployed to the field. Further, it may not be evident that a transducer in field use is in need of recalibration. Various methods and circuitry used in field equipment attempt to preserve the accuracy of a transducer by taking into account common sources of inaccuracy. For example, differential pressure signals have been corrected in the field to compensate for inaccuracy in reading ambient temperature and static pressure.

In real time usage, a digital computer may receive the signal from one or more pressure sensors and process the signals to produce an improved resulting signal. U.S. Pat. No. 4,598,381 to Cucci uses a digital computer, serving as a correction circuit, to compare a reference pressure signal to a differential sensor signal. The computer adjusts the reference signal and provides an improved output signal as a function of the differential sensor signal and the adjusted reference signal.

Another correction method is shown in U.S. Pat. No. 5,623,101 to Freitag, which corrects for inaccuracy caused by "disturbance variables," namely temperature and static pressure. Those variables influence absolute pressure and thereby reduce the accuracy of a corrected differential pressure signal. Freitag recursively calculates a corrected differential pressure signal from a measured differential pressure signal, a measured absolute-pressure signal and a temperature signal in combination with a plurality of lower degree correction polynomials. The corrected differential pressure signal may be further processed via a linearization polynomial to produce a linearization correction signal which, when combined with the corrected differential pressure signal, produces a linearization differential pressure signal.

Another such method is shown in U.S. Pat. No. 5,383,345 to Berard et al., which addresses inaccuracy caused by differences in temperature across a cell used to sense pressure. According to the method, a microprocessor calculates a dynamic temperature factor signal by multiplying a signal representative of temperature change across the cell by a coefficient based on measurements made of the effect of temperature change on the cell. The dynamic temperature factor signal is then subtracted from the signal representative of the differential pressure sensed by the cell to thereby provide the dynamic offset compensation.

U.S. Pat. No. 5,329,818 to Frick corrects the output signal of a differential pressure sensor for errors in static pressure due to changes in temperature.

It would be desirable to create an apparatus and method able to directly correct for aging and other environmental deterioration of a transducer. In particular, it would be desirable to provide a compensation algorithm capable of setting the zero level at a predetermined or ideal signal level. Further, it would be desirable to determine a contemporaneous correction factor as a function of temperature and then apply such factor to the output signal during active measurements of applied pressure.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to correct the output of a differential pressure transducer by employing a compensation routine that can determine the "zero" signal during times when a calm condition exists and can store these values as a function of temperature for use during windy and varying temperature conditions.

According to the invention, a processor in operative communication with a transducer applies a dynamic compensation algorithm. The processor continuously re-determines the necessary correction factor to set the zero level of the output signal at a predetermined or ideal zero signal point.

According to another aspect, the correction factor is determined as a function of temperature and stored in non-volatile memory. The correction factor corresponding to ambient temperature is applied to the output signal when the transducer is detecting an applied differential pressure. The correction factor is applied across the entire range of detected differential pressures.

According to a further aspect of the invention, an algorithm determines when correction factors should and should not be calculated or retained for future use. The algorithm takes the time derivative of the differential pressure. At large values of the time derivative, zeroing calculations are disengaged, and the algorithm obtains correction factors from those previously determined and stored in non-volatile memory. At small or zero values of the time derivative, the zeroing calculations are resumed.

The invention provides a method of dynamically compensating a process signal over time for a bias. First, the method monitors the first time derivative of the process signal over time. Next, the method determines from the first time derivative a first time period of predetermined length when the process signal is at zero signal level. Third, the method derives a correction factor for signal bias from the process signal during the first time period. Fourth, and subsequent to the first time period, the method determines a second time period when the process signal is not at zero signal level. Fifth, the method compensates the process signal for bias by applying the signal correction factor to the process signal over the second time period.

According to a further aspect, the process signal is monitored over time to additionally determine a time period of predetermined length during which the process signal is continuously below a predetermined threshold value.

The offset in the process signal is caused by a disturbance signal that is variable in response to a change in value of a disturbance variable. Therefore, the monitoring of the process signal over time is performed by monitoring the process signal as a function of the value of the disturbance variable over time. After deriving a signal correction factor, the method calls for recording the signal correction factor as a function of the value of the disturbance variable during the first time period. When a signal correction factor is to be applied to the process signal over the second time period, the signal correction factor selected from recorded values is a function of a recorded value of the disturbance variable that is equal to the monitored value of the disturbance variable during said second time period.

Determining when the process signal is substantially constant in magnitude over a time period can be done by taking a time derivative of the process signal. Typically, the process signal is a differential pressure signal, the disturbance signal is a zero bias, and the disturbance variable is temperature.

Another aspect of the invention is a method of dynamically calibrating a pressure transducer that produces a pressure output signal indicative of applied differential pressure. The pressure transducer is associated with a processor having access to a memory that is storing correction factors as a function of temperature. The processor applies a correction factor selected from the memory to the output signal of the transducer. The method monitors the pressure output signal over a selected time period by generating a signal representative of a first time derivative of the pressure output signal with respect to the selected time period. Ambient temperature also is sensed during the selected time period. From the time derivative signal, the method can determine whether the time derivative signal is within a preselected threshold value. The method responds to a determination that the time derivative signal is within the preselected threshold value for the selected time period by averaging the pressure output signal over the selected time period; calculating a signal bias of the averaged output signal as a correction factor; and recording the calculated correction factor as a function of temperature in memory.

The method responds to a determination that the time derivative signal is not within the preselected threshold value for the selected time period by recalling from memory a recorded correction factor corresponding to sensed temperature. The recorded correction factor is applied to the pressure output signal over the selected time period to compensate the pressure output signal for bias The invention is embodied in a dynamically calibrated differential pressure anemometer, in which an anemometer body is associated with suitable hardware, electronics, and software for (1) generating a process signal in response to movement of a fluid with respect to the anemometer body; (2) monitoring the process signal over time to determine a first time period of predetermined length during which the process signal is substantially constant in magnitude; (3) deriving a signal correction factor from the magnitude of the process signal during the first time period; (4) determining a second time period when the process signal is not substantially constant in magnitude over time; and (5) applying the signal correction factor to the process signal over the second time period to produce a compensated process signal.

The anemometer includes hardware, electronics, and software for monitoring the process signal over time to determine a time period of predetermined length during which the process signal is below a predetermined threshold value.

The anemometer body defines a fluid passageway having a constricted or Venturi-like throat producing relatively lower pressure of moving fluid in the constricted throat. A low-pressure tap communicates with the constricted throat, and a high-pressure reference tap is offset from the constricted throat. A pressure transducer is connected in operative communication with the low-pressure tap and high-pressure tap, producing a process signal corresponding to the pressure difference between the taps.

The anemometer employs suitable hardware, electronics, and software to monitor the process signal over time by determining the time derivative of the process signal.

Similarly, the anemometer employs suitable hardware, electronics, and software to derive a signal correction factor by averaging the process signal over the first time period.

In a differential pressure anemometer employing a pressure transducer, the process signal typically is offset due to a disturbance signal that is variable in response to a change in value of a disturbance variable. In order to dynamically calibrate this anemometer, suitable hardware, electronics, and software are provided to monitor the process signal over time as a function of the value of the disturbance variable over time. In addition, the anemometer includes suitable equipment for recording the determined signal correction factors as a function of the value of the disturbance variable during said first time period. Correspondingly, the anemometer includes equipment such as hardware, electronics, and software for applying the signal correction factor to the process signal over the second time period by applying a signal correction factor determined while the recorded value of the disturbance variable is equal to a monitored value of the disturbance variable during the second time period.

A pressure transducer generates the process signal in response to movement of a fluid with respect to the anemometer body. Thus, the transducer generates a signal that is indicative of sensed fluid pressure.

The disturbance signal is a product of the temperature of the transducer and varies with changes in the value of temperature. Accordingly, the anemometer includes a temperature sensor that generates a disturbance variable signal corresponding to sensed temperature values of the pressure transducer.

The anemometer employs a non-volatile memory that receives and records signal correction factors as a function of concurrent temperature values of the pressure transducer.

The accompanying drawings, which are incorporated in and form a part of the specification, illustrate preferred embodiments of the present invention, and together with the description, serve to explain the principles of the invention. In the drawings:

DETAILED DESCRIPTION OF THE INVENTION

Figure 1:
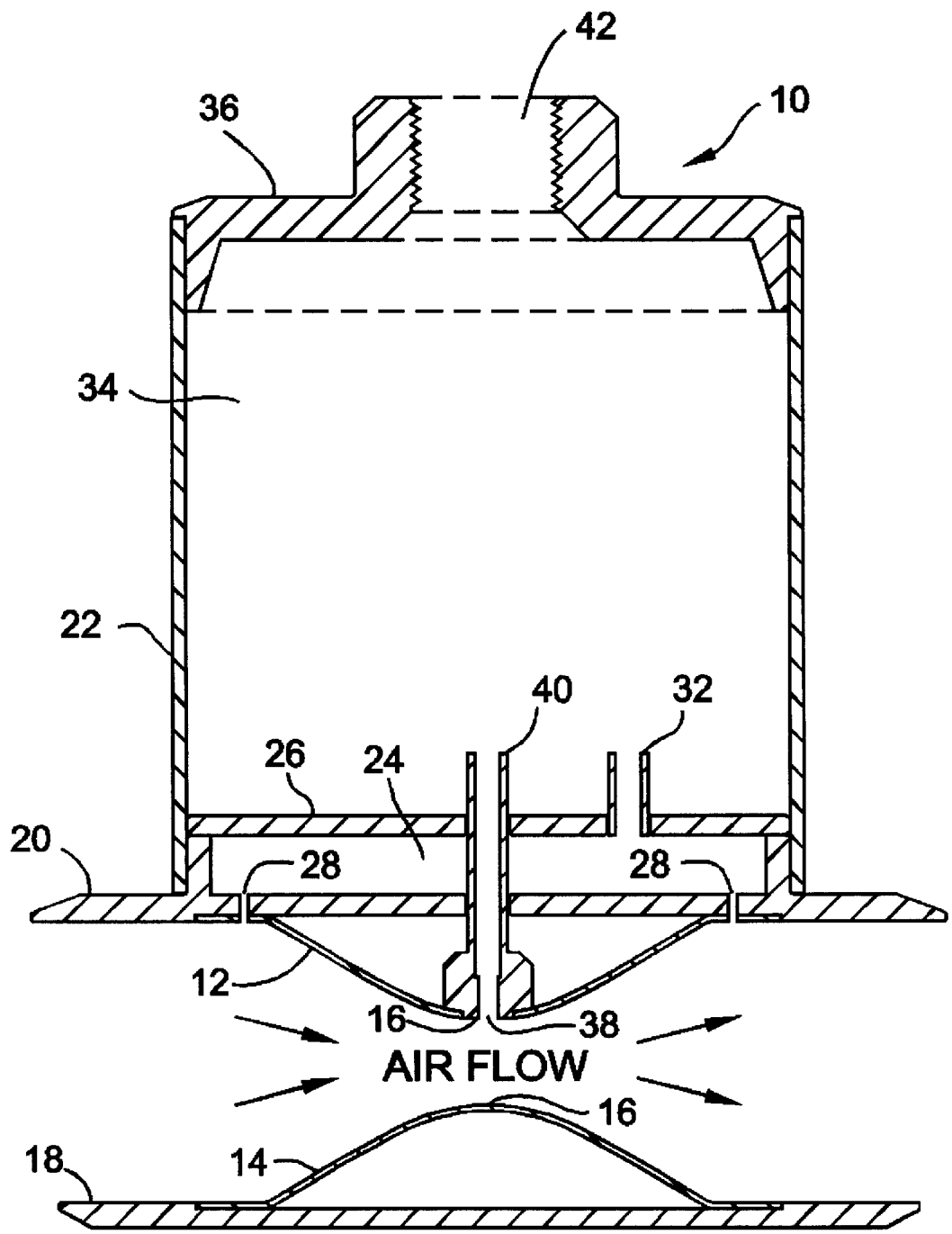
FIG. 1 is cross-sectional view of a differential pressure anemometer designed to practice the invention.

One aspect of the invention is a method for dynamic calibration of a process signal that is subject to bias, especially for dynamic calibration of a pressure transducer passing a signal whose output strength is proportional to applied pressure or pressure differential. A second aspect of the invention is a preferred differential pressure anemometer that employs a differential pressure transducer that may be operated in accordance with the method. The accuracy of a pressure transducer is determined, in part, by how closely the transducer signal corresponds to ideal output levels. For example, with an ideal output level, the signal's output strength should be linearly proportional to the applied pressure or pressure differential. The signal has a zero point or a predetermined output signal level under the condition of no applied differential pressure. Thus, on one hand the zero point is a theoretical or ideal signal output level when there is no applied differential pressure. On the other hand, the zero point is the actual signal output level under the condition of no applied pressure from a transducer that is operating perfectly and in perfect calibration. In contrast, for purposes of this disclosure and the following claims, a zero signal level will refer to the actual signal output from a transducer under the condition of no applied differential pressure. Zero level may differ from zero point due to drift, inaccuracy, or error in the operation or calibration of a transducer, which resultantly creates a bias or offset. When a bias or offset is present, a zero point signal will differ from a zero level signal. This difference may be referred to as the zero point drift. Utilizing these definitions and principles, it is possible to create and operate a differential pressure anemometer with improved accuracy of measurement over time and especially at low wind velocity.

Inaccuracy is introduced over time by aging of the transducer, by variations in temperature, and perhaps by other ambient factors, all of which can cause zero point drift. The invention provides a compensation algorithm that is applied by a processor associated with the transducer. The processor applies the compensation algorithm on a dynamic basis, as determined by the algorithm. The processor continuously determines and re-determines the necessary correction factor to set the zero level of the output signal at a predetermined or ideal zero point signal level. The correction factor is re-determined over time as a function of temperature and stored in non-volatile memory accessible by the processor. The correction factor is stored in memory as a function of ambient temperature and is applied to the output signal when the transducer is detecting an applied differential pressure. This correction factor is applied across the entire range of detected differential pressures. Because the correction factor is re-calculated and updated over time, the algorithm provides dynamic correction of the differential pressure signal as a function of both temperature and time.

The algorithm determines when correction factors should and should not be calculated or retained in memory for possible future use. The algorithm takes the time derivative of the sensed differential pressure. At large values, when the transducer is actively detecting differential pressure, zeroing calculations are disengaged; and the algorithm obtains correction factors from those previously determined and stored in non-volatile memory. For example, the algorithm selects from memory the most recently retained correction factor corresponding to ambient temperature. At small or zero values of the time derivative, when the transducer is not detecting differential pressure, the zeroing calculations are resumed, and the values in memory are updated.

A suitable differential pressure anemometer 10, which for convenience may be referred to as a "DPA," may be constructed as shown in FIG. 1. The primary element of the DPA consists of a two-dimensional venturi that develops a differential pressure as a function of wind speed. The venturi is substantially open to all sides to receive wind from any direction in a two-dimensional plane. The airflow arrows and term "air flow" in FIG. 1 suggest typical flow through the venturi, although illustrating only a left-to-right flow. The venturi is comprised of two opposed domes or convex surfaces 12 and 14. The domes of these convex surfaces are symmetrical about a third axis defined by a line passing through the two apexes 16 of the opposed convex surfaces. The apexes are at a point where the distance between the two surfaces is a minimum. The two dimensional venturi provides a differential pressure as a function of wind speed regardless of the direction of wind in the two dimensional plane.

For convenience of reference and not for purposes of limitation, the relative orientations of parts in FIG. 1, such as top, bottom, or side positions, will be used in describing the DPA. However, the orientation of the open two dimensions of the venturi is not limited to the horizontal, as suggested by such directional terminology or by the orientation of FIG. 1, although this would be a common and useful orientation.

One of the convex surfaces, such as bottom surface 14, is carried by an first or bottom air flow guide 18, which may be a flat mounting plate. A second or top airflow guide 20, which may be another flat mounting plate, carries the other convex surface 12. Surfaces 18 and 20 provide an air guide which confines the flow of air between these two surfaces and thus are environmental elements. Suitable connecting structures such as posts or brackets may be helpful for connecting or supporting the airflow guides 18, 20 in order to establish their relative position and spacing. If used, such connecting structures preferably are sufficiently distanced from the venturi or are sufficiently insubstantial in their physical structure that they do not substantially interfere with wind movement through the venturi. Because of the possible presence of such connecting structures, even though their presence should be minimal and insignificant to the operation of the anemometer, the venturi has been described as "substantially" open.

One of the airflow guides, such as top guide 20, may carry a housing shell 22 for containing an electronics package. In addition, the DPA includes high and low pressure references, each in communication with a selected pressure realm of the external atmosphere. These two pressure references may be incorporated within the housing shell. A first such reference is a high-pressure cavity 24, preferably defined between the top airflow guide 20 and a high-pressure cavity cap 26, which is spaced above the top guide 20. The housing shell 22 closes the side portions of the cavity between the guide 20 and cap 26. A plurality of small taps 28, which may consist of nine such taps, is spaced on equal chord lengths and at equal radial distances from apex 16 of the top dome and around the top convex surface. These taps provide communication of the air pressure from outside the venturi throat to the high-pressure cavity. Thus, the taps 28 provide a high-pressure reference for use by the electronics package. A high-pressure conduit 32 may communicate through the high-pressure cap, providing a high-pressure reference at an end of conduit 32 within an electronics package chamber located above the high-pressure cap.

An electronics package chamber 34 preferably is defined between the high-pressure cavity cap 26 and a top flange 36, which is spaced above the cap 26. The top flange 36 seals the housing from environmental elements. The housing shell 22 closes the side portions of the cavity between the cap 26 and flange 36. The chamber 34 can serve as a housing for a differential pressure transducer and for an associated electronics package. As a prudent measure in installations where the electronics package may be exposed to high heat, the electronics package should be shielded from potentially damaging effects of the heat. Where the heat source is the sun, an expeditious way of accomplishing this protection is to provide a radiation shield for protecting the electronics package chamber from direct exposure to sunlight. The design and placement of such a radiation shield should take into account that the shield should not interfere with the operation of the anemometer. As the design and necessity for such a shield may differ according to the requirements of a particular installation, the potential desirability of using such a shield is mentioned here without suggesting finer details of construction.

A small hole 38 at the apex of top dome 12 serves as a low-pressure tap, which senses the relatively lower pressure of air moving through the narrow throat of the venturi. The low pressure is communicated through a low pressure conduit 40 that extends from the hole 38, passes through the high pressure cavity, and provides a low-pressure reference at an end of conduit 40 within the electronics package chamber 34. Thus, a transducer located in the chamber 34 has ready access to both high and low pressure references. A threaded port 42 in top flange 36 serves as mounting point and also provides a passageway for electrical connections. A measured differential pressure between conduits 32 and 40 then can be related to wind speed. This phenomenon is similar to the traditional one-dimensional venturi as used in carburetors, eductors and the like. The DPA 10 uses basic venturi principles to measure metrological wind speeds.

It is desirable to obtain high accuracy from the anemometer over a wide range of wind speeds, including at low wind speeds where differential pressures are small, such as on the order of 0.003 inches of water at 1 m/s wind speed. When processing a low-pressure response to low wind speeds, any drift or offset in the pressure transducer due to temperature variations would yield relatively large wind speed errors. For example, the pressure transducer used in this anemometer may be a temperature compensated Honeywell brand, model 164PC01D76, which the manufacturer represents as capable of measuring zero to five inches of water column differential. The manufacturer's specifications list a maximum error of 1.0% of full scale over a 20-degree C. temperature range. Despite the factory temperature compensation, these specifications allow a resulting error over 4 m/s when used in the anemometer.

Figure 2:
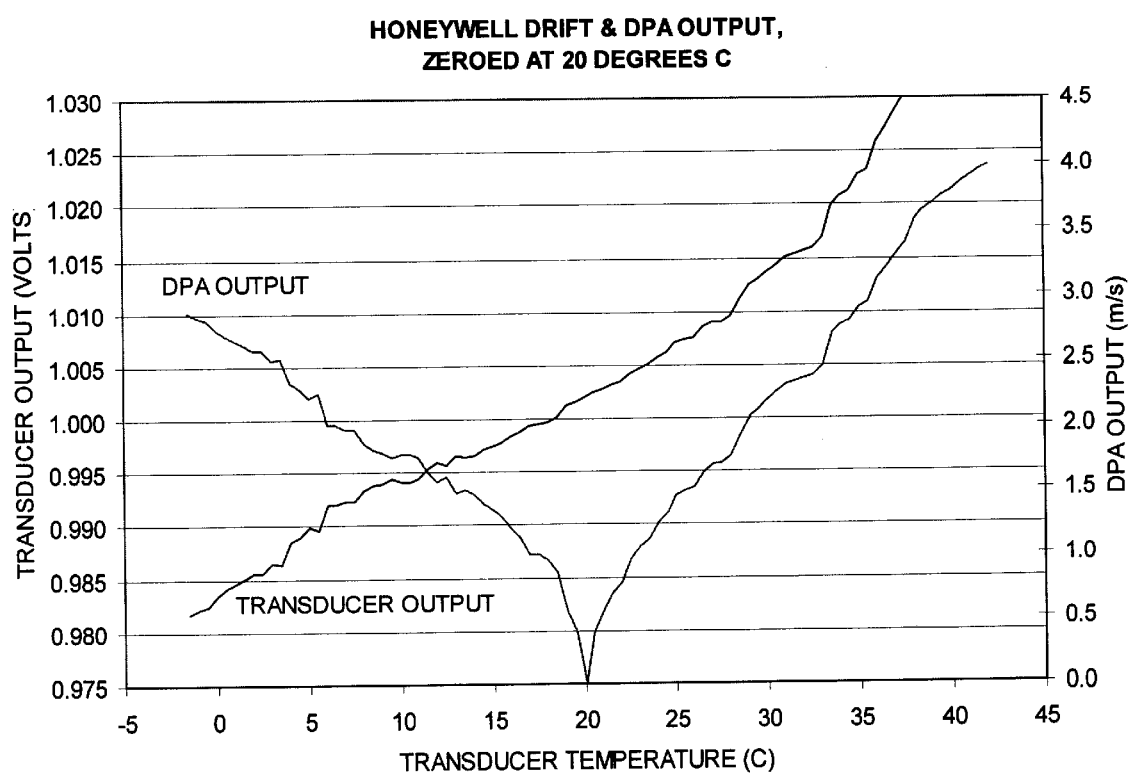
FIG. 2 is a graph showing zero signal level performance of a Honeywell brand transducer in a differential pressure anemometer at various transducer temperatures.

With reference to the graph of FIG. 2, titled "Honeywell Drift & DPA Output, Zeroed at 20 deg. C.," the Honeywell transducer was tested over a range of temperatures, and its drift is shown in the graph. Nominal output is 1 volt at zero differential pressure. Measured output of the transducer with zero differential pressure was recorded as a function of temperature on the trace labeled "Transducer Output." The recorded data shows the drift of transducer output as a function of temperature. From this data, wind speeds were calculated as though the instrument were operating in normal service. Wind speed calculations labeled "DPA Output" are based on the transducer and related electronics being zeroed at 20 degrees C., which is similar to other instruments that are calibrated at a given temperature. The wind speed calculations are based on the magnitude difference or "absolute value" measured between the zero value and a value measured at some other point. The use of absolute value accounts for the fact that wind speed shown on the "DPA Output" trace never drops below zero. The graph shows that Transducer Output rises from 0.980 volts to 1.030 volts as temperature increases from −2 degrees C. to 42 degrees C. Correspondingly, the indicated wind speed shown as DPA Output varies from 3 m/s to zero m/s and then to 4 m/s, all due to zero point drift when true pressure differential is zero.

Another temperature compensated transducer was similarly tested. A SenSym brand, model SMRT AT, 2510 measures 1–10 inches of water column differential, with specifications calling for better than 0.4% full scale accuracy. The SenSym output is a digital word, directly representing the measured pressure. The results of testing are shown FIG. 3, titled "SenSym Drift & DPA Output, Zeroed at 20 deg C." One trace of the graph identified as Transducer Output reports transducer drift as measured pressure, falling from −0.005 to −0.050, while calculated wind speed rises from 1 m/s to 2.5 m/s. Even with such good specifications, this transducer yielded more than 2 m/s wind speed error.

Figure 3:
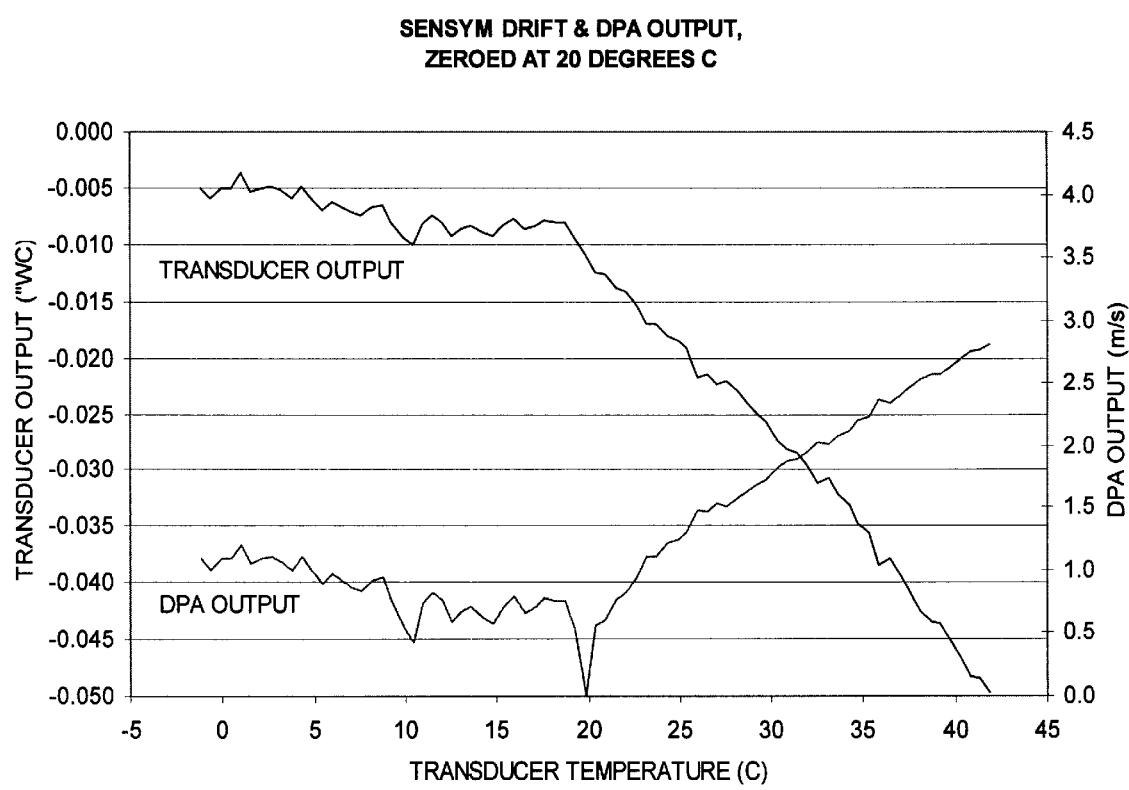
FIG. 3 is a graph showing zero point performance of a SenSym brand transducer in a differential pressure anemometer at various transducer temperatures.

The tests shown in FIGS. 2 and 3 demonstrate that even temperature compensated transducers are not sufficiently free of drift to enable accurate measurement of low wind speeds. An ultimately desirable differential pressure transducer would have zero drift, but such transducers are likely to require rigorous testing and to be costly. Thus, the testing results shown in FIGS. 2 and 3 demonstrate a problem to which an alternative solution is needed. Most temperature compensation techniques used commercially are static. The compensation routines trim the output of the transducer based upon correction factors determined at the time the transducer is manufactured. For example, the Honeywell transducer is corrected by using laser trimmed analog circuitry to match the electronic characteristics to the sensing element. The SenSym transducer is corrected by use of a microprocessor in which correction coefficients are programmed in memory during calibration in an environmental chamber, done at the time when the device was manufactured. The SenSyn transducer can be re-programmed if returned to the manufacturer for re-calibration. Otherwise, in both cases, the corrections are determined once, either during design of the electronics or during calibration, and the compensation factors are unique to each transducer. Establishing such compensation factors commonly is known as fingerprinting the transducer. Once the transducer has been manufactured, the correction techniques remain static.

The pressure transducer requirements for the anemometer 10 require a technology that allows dynamic temperature compensation. Particularly at zero differential pressure, it would be desirable to track the output of the transducer over a given temperature range. Accordingly, a dynamic offset compensation algorithm was created to meet this need. The method of the algorithm is best explained against the background of FIG. 4, titled, "DPA Wind Speed Calculation Error Due to Drift Example, Worst Case using 1% FS (5 in WC) Drift." One trace shows "Error" at actual differential pressure, ranging from 100% at low differential pressure of 0.05 to about 2% error at higher differential pressure of 1.5.

Figure 4:
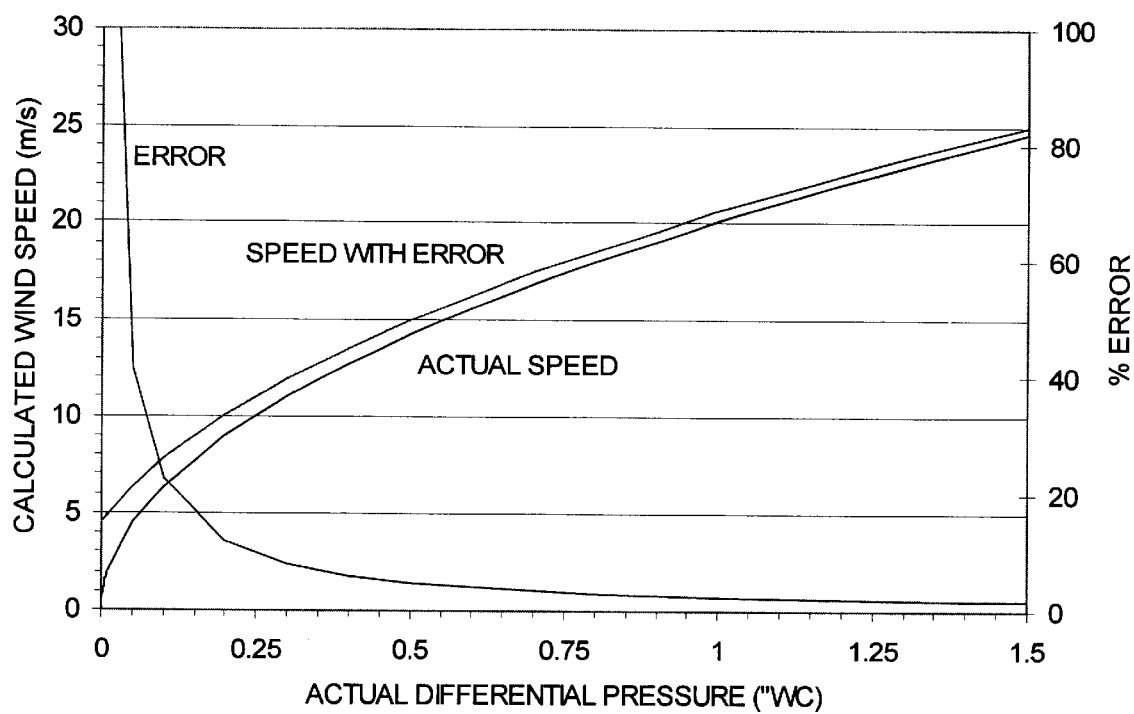
FIG. 4 is a graph showing an example of how error embodied as zero point drift may effect wind speed calculations in a differential pressure anemometer.

The error percentage is applied to the trace titled, "Actual Speed," to produce the trace titled, "Speed w/Error." As clearly shown by this FIG. 4, the errors introduced into the calculations are proportionately largest at low wind speeds, which correspond to low signal levels. The errors quickly taper off as the wind speed increases.

Thus, FIG. 4 demonstrates that corrections to the signal are most crucial at low signal levels. Moreover, as the signal level increases, errors still exist in wind speed calculations, although to a lesser degree, dictating that the correction routine must remember what corrections were determined previously. This consideration can be important, as ambient temperature may change by 10 to 20 degrees C. over a short time interval when a weather front passes through, which usually is associated with windy conditions.

Therefore, the method of this invention has developed the unique approach of creating a compensation routine that can determine a correction factor to set the zero level signal equal to the zero point signal during times when a calm condition exists and can store these values as a function of temperature for use during windy and varying temperature conditions. The algorithm that operates according to this method will be referred to as the dynamic offset compensation algorithm or DOCA. This compensation algorithm is employed in combination with a microprocessor that determines the zero differential pressure output level of a pressure transducer during times when there is no wind speed. Consequently, an important aspect of the invention is that calm conditions are required for performance of the self-calibration process. The DOCA is not intended for use in an application that always measures signals above zero differential pressure.

The concept of bias value can be explained with reference to the Honeywell transducer. This transducer has a zero differential pressure output level nominally of 1 VDC; but as mentioned before, this output level can vary 1.0% of full-scale output depending upon temperature. The variation in output level from the specified nominal output level is called the bias. The method employs the bias value as a correction factor that is subtracted from the measured value to produce a final differential pressure of improved accuracy for use in wind speed calculations. The bias values are stored in non-volatile memory as a function of temperature and are modified on an "as needed" basis during operation of the instrument as determined by the algorithm, thereby adding a dynamic element to the dynamic offset compensation algorithm.

At zero applied differential pressure, the algorithm continuously calculates new bias values as a function of temperature and stores the results in non-volatile memory for use during times of a windy condition, thereby increasing the accuracy of the anemometer over the entire operating range. During windy conditions, the time derivative of the wind and, correspondingly, the time derivative of the differential pressure are large in value, relative to a calm condition. It is possible to determine the existence of a windy condition by such calculations. Once a windy condition is determined, the algorithm disables any further zeroing attempts. The algorithm continues compensation of the pressure signal during windy condition by relying on bias values stored in memory as a function of temperature. Once the time derivative of the signal output level falls below a pre-defined value, indicating a windy condition has ceased, the algorithm resumes calculating the zero signal level bias values. In summary, calculation of zero signal level bias values is disabled during windy conditions and re-enabled when a calm condition is detected.

In addition to calculating zero signal level bias values, the algorithm also employs several stages of low pass digital filters in order to provide noise filtering and prevent false time derivative calculations causing erroneous triggering of the zeroing routine. A final signal output stage employs a switchable low pass digital filter that switches between two sets of filtering characteristics, depending upon whether a windy condition is determined. These measures provide a stable output signal at low wind speeds and a faster response at higher wind speeds.

The algorithm provides several adaptive abilities, which include self-learning of compensation values, the ability of the instrument to change with time as the transducer ages, and the ability to adapt from one transducer to another, as would be encountered in producing instruments on a production scale. This adaptive ability eliminates the costly fingerprinting of each transducer as found in current practice and allows the instrument to adapt both to physical changes of the transducer as well and to the replacement of one transducer with another.

Theory of Operation—Conceptual Disclosure

The algorithm compensates a process signal, which is offset by a disturbance signal. In the preferred embodiment presented here, the process signal is a differential pressure signal representing a function of wind speed; and the disturbance signal is the transducer temperature, which causes a drift in the differential pressure output signal. The temperature of the pressure transducer influences the resultant output signal for many reasons, which include thermal stresses on the sensing element, on the sensor housing, and on the electronic amplification circuitry. The output of the pressure transducer may be described as two components: 1) the actual measured differential pressure and 2) a drift component which is a function of temperature typically referred to as the "null offset". This may be mathematically written as:

$$V_{\Delta P}(t) = K_1 \cdot \Delta P(t) + K_2 \cdot T(t)$$

where:

$V_{\Delta P}$=transducer output voltage
$\Delta P$=differential pressure
$K_1$=pressure constant
$K_2$=temperature constant
T=transducer temperature
t=time NOTE: Several other parameters such as transducer supply voltage etc. have been left out for clarity.

An ideal pressure transducer would have $K_2$=0 giving rise to a pressure transducer that is perfectly immune to temperature. The temperature influences typically reduce the signal-to-noise ratio of the transducer at the low end of the measurement range. When used in an application that requires non-linear math (square rooting for example) for the final output value, the low-end measurement errors are greatly magnified, which may make it impossible to use these types of flow measurement techniques.

To minimize the errors at the low-end of the measurement range, a compensation technique is required which attempts to cancel the temperature term. This may be expressed as:

$$U_{\Delta P}(t) = K_1 \cdot \Delta P(t) + K_2 \cdot T(t) + \Phi(T)$$

where:

$U_{\Delta P}(t)$=Compensated transducer signal
$\Phi(T)$=Compensation value as a function of temperature.

Ideally, the argument $\Phi(T)$ would exactly equal the negative of $K_2 \cdot T(t)$ resulting in cancellation of the two arguments and leaving only the differential pressure term. Typically, the compensation values are fixed functions of temperature by analog circuit design or by digital lookup tables, which are determined at the time of manufacture. Since the compensation values are fixed, the null offset of the transducer cannot be compensated for any influences as a function of time.

The foregoing considerations give rise to the Dynamic Offset Compensation Algorithm (DOCA) that, over time, tracks transducer drift. The DOCA may be mathematically expressed as follows:

$$U_{\Delta P}(t) = K_1 \cdot \Delta P(t) + K_2 \cdot T(t) + \Phi(T,t)$$

where:

$\Phi(T,t)$=Compensation value as a function of temperature AND time.

The DOCA yields features that include the ability of the algorithm to "learn" and "track" compensation values, as $\Phi(T,t)$ is a function of both temperature and time. This can significantly reduce the overhead manufacturing costs associated with one-time, factory calibrations, as presently practiced, and make the transducer more flexible over time.

The key to understanding the DOCA compensation technique is the fact that the disturbance signal varies in time much less than the process signal. In the differential pressure anemometer, a windy condition imparts a "noisy" pressure signal due to turbulence and gusty conditions; and the temperature changes within the pressure transducer are almost undetectable within the time frame of the pressure changes. This can mathematically be written as:

$$K_2 \cdot \frac{d}{dt} T(t) \ll K_1 \cdot \frac{d}{dt} \Delta P(t)$$

With the above statement, the time derivative of the temperature may be considered practically zero with regards to the pressure signal. Therefore, the time derivative of the output signal can be expressed as:

$$\frac{d}{dt} V_{\Delta P} \cong K_1 \cdot \frac{d}{dt} \Delta P(t)$$

Using these concepts, an algorithm could compensate a pressure signal for temperature by determining whether or not the process signal (the wind itself) exhibits attributes of a windy condition by inspecting the time derivative of the pressure transducer output signal (provided the above mentioned relations hold true). During times of calm wind conditions, the output signal of the pressure transducer becomes relatively constant, but not necessarily zero, and therefore the time derivative becomes nearly zero. When the time derivative of the differential pressure transducer's output signal falls below a pre-defined threshold, the algorithm would enable a separate sub-routine. This subroutine would average the signal representing the zero differential pressure and, thus, representing a calm wind condition. The average signal then would be compared to the predefined zero point in arriving at a compensation value. When such compensation is done repetitively over time, any drift due to temperature or other slowly varying influences would be minimized. This concept is the foundation of the DOCA.

To further enhance the application of DOCA compensation technique, the algorithm periodically stores the compensation values in non-volatile memory. The stored values provide the compensation factors both immediately after a power up and during times when the compensation algorithm determines that the process signal does not represent a valid zero signal as temperature of the transducer changes. This situation typically may occur during passage of a changing weather front or when the sun's radiation on the instrument changes.

With an algorithm capable of continuously tracking the drift of a transducer and also capable of storing the resultant compensation values, a transducer's low-end accuracy can be greatly increased. In the case of the differential pressure anemometer, the accuracy of the low-end wind speed measurement range is greatly increased.

Theory of Operation—Technical Disclosure

Figure 5A:
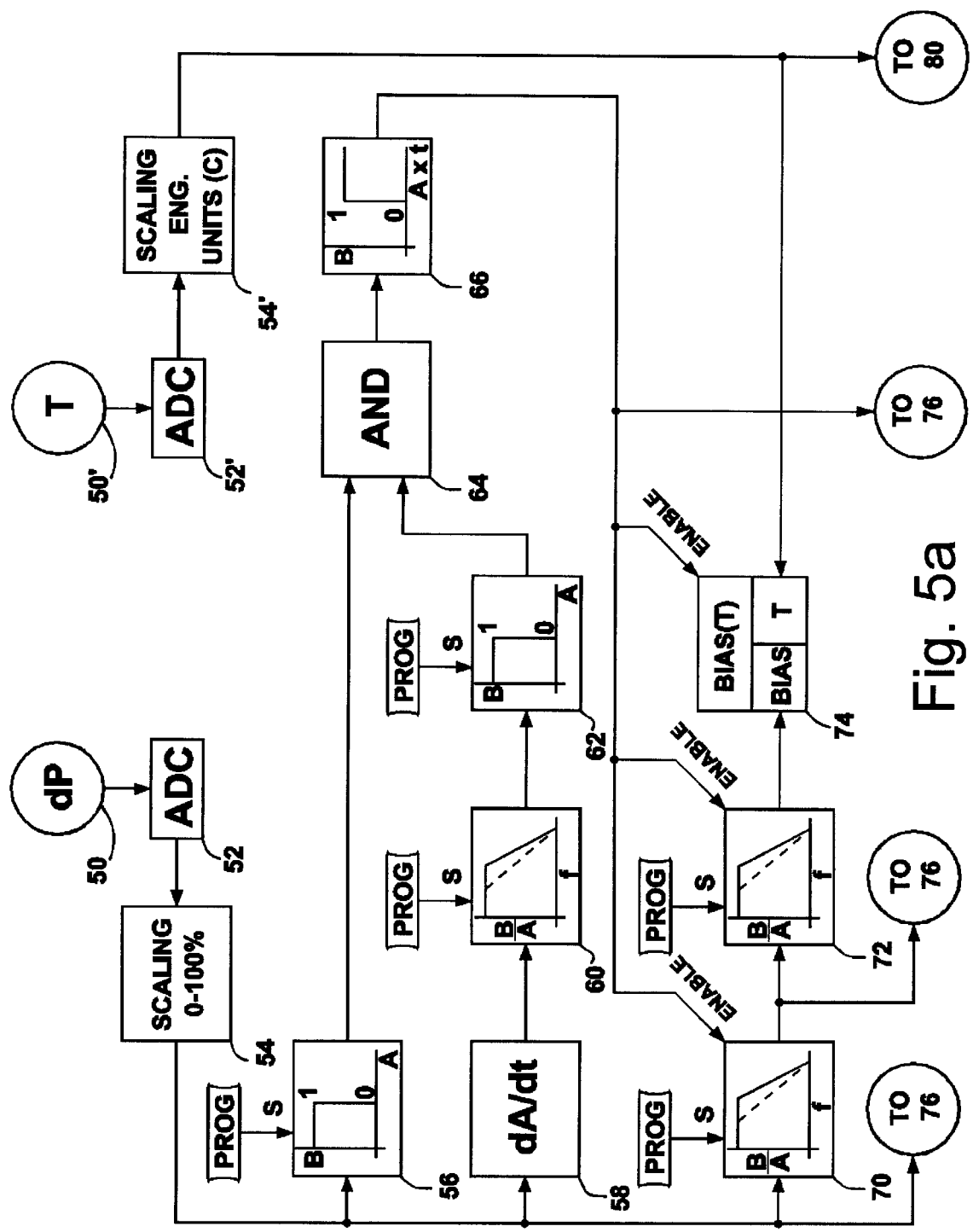
FIGS. 5a and 5b are a schematic flow diagram showing the operational scheme for a dynamic offset compensation algorithm that dynamically corrects zero point of a differential pressure transducer subject to periods of calm.
Figure 5B:
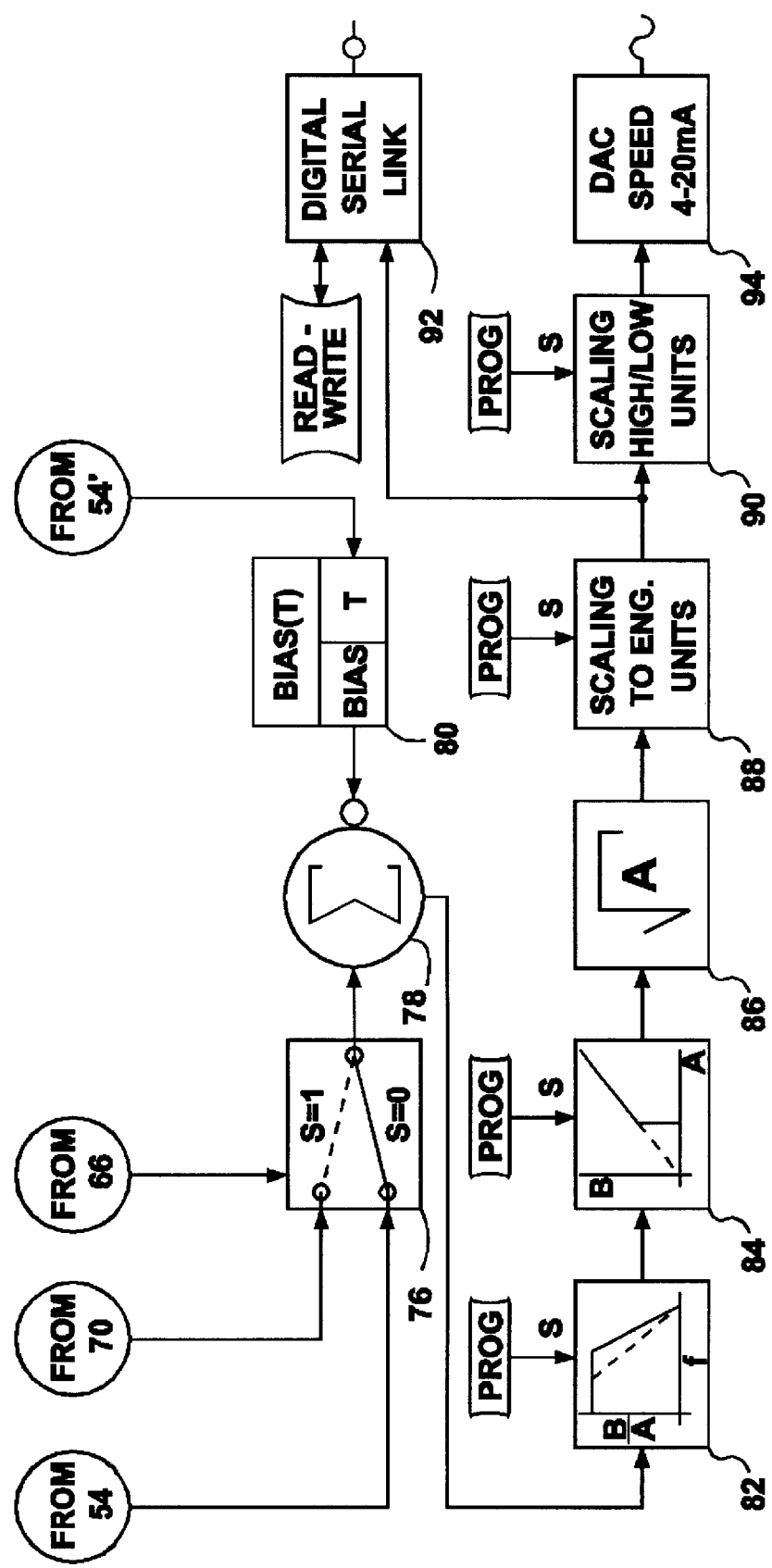

The preceding disclosure provides an enabling understanding of the Dynamic Offset Compensation Algorithm. A functional, best mode presently known now will be disclosed. The disclosure of best mode pertains to the application of the DOCA as applied for temperature compensation for use in a differential pressure anemometer such as the one shown in FIG. 1. The disclosure refers to the block diagram of FIGS. 5a and 5b to describe the electronics package and software that would be found in chamber 34 of the DPA. In the discussion and in FIGS. 5a and 5b, the following terms have the indicated meaning:

T=temperature
dP=differential pressure
t=time
A=function block input
B=function block output
F=frequency
Dp=transducer measuring differential pressure
S=Function block control input (variable)
ADC=Analog to Digital Converter
DAC=Digital to Analog Converter
Prog=Variable which is programmable
Enable=Function block enable (1=enabled)

The primary component blocks of the diagram have the following functions:

50 and 50' are transducer blocks. The output signal is an electrical representation of the input process signal. The designation "dP" in block 50 refers to a differential pressure transducer, while the designation "T" in block 50' indicates a temperature transducer.

52 and 52' are analog to digital converter blocks. The output signal is a digital representation of the electrical analog input signal.

54, 54', and 88 are scaling blocks.

56, 62, and 66 are low signal detector blocks. The output "B" is a logical one when the input signal "A" is below a predefined threshold. This threshold is a programmed variable that is adjustable as denoted by "S."

58 is a time derivative function block. The output signal "B" is the time derivative of the input signal "A."

60, 70, 72, and 82 are low pass, first order filter blocks. The output signal "B" contains only the low frequency components of the input signal "A." The filter characteristics are programmed variables that are adjustable as denoted by "S."

64 is a logical AND block. A logic output signal "B" is the result of the logical AND operation on the logic input signals.

74 and 80 are lookup table blocks. The table contains two columns that can be modified or read as denoted by flow arrows when used in the drawing.

76 is a selector switch block. An output signal "B" selectively is either one of two input signals "A," depending upon the logical state of "S."

78 is a summation block. An output signal "B" exiting the bottom of block 78 is the sum of input signals A1 from the right side and A2 from the left side of the block. The small circle on the right of block 78 indicates input signal A1 is inverted, such that B=A2−A1.

84 is a low signal cutoff block. The output signal "B" is zero when the input signal "A" is below a predefined threshold and otherwise equals the input signal. The threshold is adjustable as denoted by "S."

86 is a square root block. An output signal "B" is the mathematical square root of an input signal "A."

The differential pressure signal to be compensated enters the circuit at the transducer 50 and then is digitized at the analog-to-digital converter 52. In order to minimize the software dependence on the character of the signal to be measured (range of measurement) the signal is scaled 0 to 100 percent at scaling block 54 based on the analog-to-digital converter's range.

The signal for which compensation is to be made, in this case the temperature of the differential pressure sensor, enters the circuit at block 50' and is digitized and scaled in the same manner at analog-to-digital converter 52' and scaling block 54'.

All further signal conditioning is based on the 0–100% signal, until the final output stage of the circuit at scaling block 88.

The output from scaling block 54 is made available to several other functions blocks, which perform different tasks, as follow. Function block 56 is a low-level signal detector in which the threshold of the signal is programmable. This function outputs a logical 0 or 1 depending whether the input signal is above or below the threshold. This portion of the circuit performs the first step in determining if the compensation filter is to be active or inactive (on hold) and guarantees the filter to be deactivated above a known threshold.

The scaled signal from scaling block 54 also enters block 58, which outputs a signal representing the first time derivative of the pressure signal. A first order low pass filter, function block 60, filters this signal, which then passes through the low-level signal detector at 62. The result of function blocks 58 through 62 provides a logical signal that represents the level of noise in the pressure signal and is the second part of the circuit that determines whether the compensation filter is to be active or inactive.

The two signals from function blocks 56 and 62 are logically ANDed at function block 64. The output from block 64 is then time-delayed-on by function block 66 which requires the input signal to be valid for a specified period of time before the output is set. The output from block 66 is a final enable/disable signal that can permit tracking of the transducer drift. The logical "enable" signal represents that the pressure signal has been quiet for a specified time, and in the case of the differential pressure anemometer, would represent a calm wind condition. The signal from function block 56 would still ensure the filter to be disabled should a condition occur where the wind is other than calm and also quiet—as may be the case at higher laminar flows.

The output signal from function block 66 also is used by function block 76 to select a signal from two different points along the signal path. One selection is the non-filtered signal from block 54, whereas the other selection is the filtered signal from block 70. Typically, at low signal levels, more filtering is required to stabilize the final output, due to square rooting. This selection allows for additional filtering of the pressure signal at or near zero differential pressures, yet provides faster responses during higher level, windy signals.

The output signal from filter block 72 represents the compensation value Φ(T,t) which is then stored in memory at block 74 for later use during final signal compensation.

The signal from block 76 enters summation block 78, which adds the negative of the compensation value Φ(T,t) from 80. Function blocks 74 and 80 differ only in that one data is written-to and the other data is read-from.

The output of function block 78 represents the compensated pressure transducer signal. This signal is then passed through the low pass filter at block 82 for final filtering. The output from block 82 then passes through a low-signal cutoff block at 84, which forces the output to zero when the input falls below a pre-defined threshold.

The output signal of function block 84 then passes through the square root function at 86, which linearizes the wind speed with the measured differential pressure. The signal then is scaled to engineering units at function block 88. This is the final stage of the Digital Offset Compensation Algorithm.

Function block 90 scales the signal from block 88 to the desired high and low engineering units for use in the analog output circuit. The high and low engineering ranges are programmable parameters denoted by S and allow a scaled analog representation of the signal other than the actual measured signal. For example, the DPA may be calibrated to measure 0–50 m/s wind speed but in a particular application it may be desired for the analog signal to represent only 1–20 m/s.

Function block 92 serves as a serial RS-232/RS-485 digital interface in which the programmable parameters can be read or written and permits the reading of all real time variables, including wind speed, transducer temperature, stored temperature profile, biasing values, etc. The digital interface also provides a means of placing the instrument in various calibrating modes and analog loop check/testing modes.

Function block 94 converts the digital representation of the wind speed as scaled by function block 90 to a standard 4–20 mA loop for measurements by a user's data acquisition system or display system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A method of dynamically compensating a process signal over time for bias, comprising:
    first, monitoring the first time derivative of said process signal over time;
    second, determining from said first time derivative a first time period of predetermined length when the process signal is within a preselected threshold of a zero signal level;
    third, deriving a correction factor for signal bias from the process signal during said first time period;
    fourth, subsequent to said first time period, determining a second time period when the process signal is not within a preselected threshold of zero signal level; and
    factor fifth, compensating the process signal for bias by applying said signal correction process signal over said second time period.

2. The method of claim 1, wherein said second step is performed by monitoring the process signal over time to determine a time period of predetermined length during which the process signal is below a predetermined threshold value.

3. The method of claim 1, wherein said second step is performed by determining a time period of predetermined length during which said time derivative is below a predetermined threshold value.

4. The method of claim 1, wherein said process signal is a differential pressure signal.

5. The method of claim 1, wherein said bias is caused by a disturbance signal that is variable in response to a change in value of a disturbance variable, and wherein the method further comprises:
    further performing said second step by monitoring the process signal as a function of the value of the disturbance variable over time;
    after said third step and prior to the fourth step, recording in a memory the derived signal correction factor as a function of the value of the disturbance variable during said first time period; and
    performing said fifth step by recalling from said memory a signal correction factor that is a function of a recorded value of the disturbance variable that is equal to a value of the disturbance variable during said second time period.

6. The method of claim 5, wherein said disturbance variable is temperature.

7. A method of dynamically calibrating a pressure transducer that produces a pressure output signal indicative of applied differential pressure, in which the pressure transducer is associated with a processor having access to a memory that stores correction factors as a function of temperature, wherein the processor applies a correction factor selected from the memory to the output signal of the transducer, wherein the method comprises:
    monitoring said pressure output signal over a selected time period by generating a signal representative of a first time derivative of the pressure output signal with respect to said selected time period;
    sensing ambient temperature during the selected time period;
    determining whether said time derivative signal is within a preselected threshold value; and
    responding to a determination that the time derivative signal is within the preselected threshold value for the selected time period by:
        averaging the pressure output signal over the selected time period;
        calculating a signal bias of said averaged output signal as a correction factor; and
        recording said calculated correction factor as a function of temperature in said memory.

8. The method of claim 7, further comprising:
    responding to a determination that for said selected time period the time derivative signal is not within the preselected threshold value by:
        recalling from said memory a recorded correction factor corresponding to said sensed temperature; and
        compensating the pressure output signal for bias by applying said recalled correction factor to the pressure output signal over the selected time period.

9. A dynamically calibrated differential pressure anemometer, comprising:
    an anemometer body;
    means for generating a process signal in response to movement of a fluid with respect to the anemometer body;

means for monitoring a derivative of said process signal over time to determine a first time period of predetermined length during which said process signal is substantially constant in magnitude and below a preselected threshold value;

means for deriving a signal correction factor from the magnitude of the process signal during said first time period;

means for determining a second time period when the process signal is not substantially constant in magnitude over time; and means for applying said signal correction factor to the process signal over said second to produce a compensated process signal.

10. The dynamically calibrated differential pressure anemometer of claim 9, wherein:

said anemometer body defines a fluid passageway having a constricted throat producing relatively lower pressure of moving fluid in the constricted throat; and wherein said means for generating a process signal further comprises:

a low pressure tap communicating with the constricted throat;

a high pressure reference tap offset from the constricted throat; and a pressure transducer in operative communication with said low pressure tap and high pressure tap, producing a process signal corresponding to the pressure difference between the taps.

11. The dynamically calibrated differential pressure anemometer of claim 9, wherein said means for deriving a signal correction factor comprises:

means for averaging said process signal over said first time period.

12. The dynamically calibrated differential pressure anemometer of claim 9, wherein the dynamic calibration compensates a process signal for an offset caused by a disturbance signal that is variable in response to a change in value of a disturbance variable, further comprising:

means monitoring said process signal over time by monitoring the process signal as a function of the value of the disturbance variable over time;

means responsive to said means for deriving a signal correction factor, for recording the signal correction factor as a function of the value of the disturbance variable during said first time period; and means for applying the signal correction factor to the process signal over the second time period by applying a signal correction factor determined while the recorded value of the disturbance variable is equal to a monitored value of the disturbance variable during said second time period.

13. The dynamically calibrated differential pressure anemometer of claim 12, wherein said means for generating a process signal in response to movement of a fluid with respect to the anemometer body comprises:

a pressure transducer generating a signal corresponding to a sensed fluid pressure.

14. The dynamically calibrated differential pressure anemometer of claim 11, wherein said means monitoring said process signal over time by monitoring the process signal as a function of the value of the disturbance variable over time, comprises:

a temperature sensor generating a disturbance variable signal corresponding to sensed temperature values of the pressure transducer.

15. The dynamically calibrated differential pressure anemometer of claim 14, wherein said means for recording the signal correction factor as a function of the value of the disturbance variable during said first time period, comprises:

a non-volatile memory receiving and recording signal correction factors as a function of concurrent temperature values of the pressure transducer.

* * * * *